(12) United States Patent
Min

(10) Patent No.: US 10,315,444 B2
(45) Date of Patent: Jun. 11, 2019

(54) PRINTING DEVICE

(71) Applicant: KOSTECH, INC., Seoul (KR)

(72) Inventor: Kyung-Won Min, Seoul (KR)

(73) Assignee: KOSTECH, INC., Seoul (KR)

( * ) Notice: Subject to any disclaimer, the term of this patent is extended or adjusted under 35 U.S.C. 154(b) by 126 days.

(21) Appl. No.: 15/527,859

(22) PCT Filed: May 27, 2016

(86) PCT No.: PCT/KR2016/005611
§ 371 (c)(1),
(2) Date: May 18, 2017

(87) PCT Pub. No.: WO2017/047905
PCT Pub. Date: Mar. 23, 2017

(65) Prior Publication Data
US 2018/0345695 A1    Dec. 6, 2018

(30) Foreign Application Priority Data

Sep. 17, 2015 (KR) .................. 10-2015-0131761

(51) Int. Cl.
| | |
|---|---|
| B41J 15/16 | (2006.01) |
| F16H 1/16 | (2006.01) |
| F16H 7/02 | (2006.01) |
| F16H 19/04 | (2006.01) |
| G01L 5/04 | (2006.01) |
| B41J 3/407 | (2006.01) |
| B41J 11/00 | (2006.01) |
| B41J 15/04 | (2006.01) |

(52) U.S. Cl.
CPC ............ B41J 15/16 (2013.01); B41J 3/4078 (2013.01); B41J 11/002 (2013.01); B41J 15/042 (2013.01); F16H 1/16 (2013.01); F16H 7/02 (2013.01); F16H 19/04 (2013.01); G01L 5/04 (2013.01)

(58) Field of Classification Search
None
See application file for complete search history.

(56) References Cited

U.S. PATENT DOCUMENTS

| | | |
|---|---|---|
| 6,568,865 B1 | 5/2003 | Fujioka et al. |
| 7,802,599 B2 | 9/2010 | Hunahata |
| 2013/0239831 A1 | 9/2013 | Lee et al. |

FOREIGN PATENT DOCUMENTS

| | | |
|---|---|---|
| JP | 3685374 B2 | 6/2005 |
| JP | 2007-015235 A | 1/2007 |
| KR | 10-2008-0077072 A | 8/2008 |
| KR | 2010-0062626 A | 6/2010 |
| KR | 10-1012450 B1 | 2/2011 |
| KR | 10-2011-0110437 A | 10/2011 |

(Continued)

OTHER PUBLICATIONS

International Search Report and Written Opinion for corresponding Patent Application No. PCT/KR2016/005611 dated Aug. 26, 2016.

*Primary Examiner* — Alejandro Valencia

(74) *Attorney, Agent, or Firm* — Renner, Otto, Boisselle & Sklar, LLP

(57) ABSTRACT

A printing device includes a main body including a printing unit for printing on a material, and a winding unit for winding a printed material; and a moving device provided in the main body and configured to allow the winding unit to reciprocate between an outlet space of the printing unit and an inlet space thereof.

10 Claims, 6 Drawing Sheets

(56) References Cited

FOREIGN PATENT DOCUMENTS

| KR | 2013-0006270 A | 1/2013 |
|---|---|---|
| KR | 10-1344757 B1 | 12/2013 |
| KR | 10-1385874 B1 | 4/2014 |
| KR | 10-1445109 B1 | 10/2014 |

[FIG. 1]
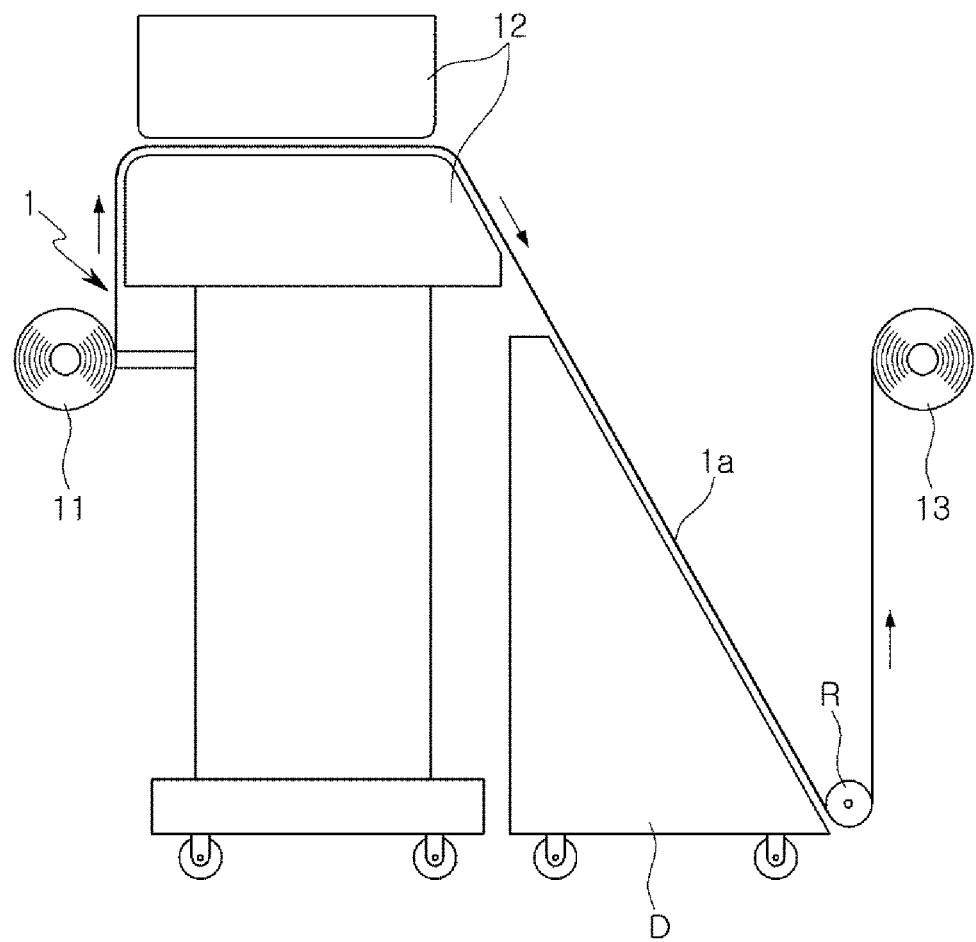

[FIG. 2]
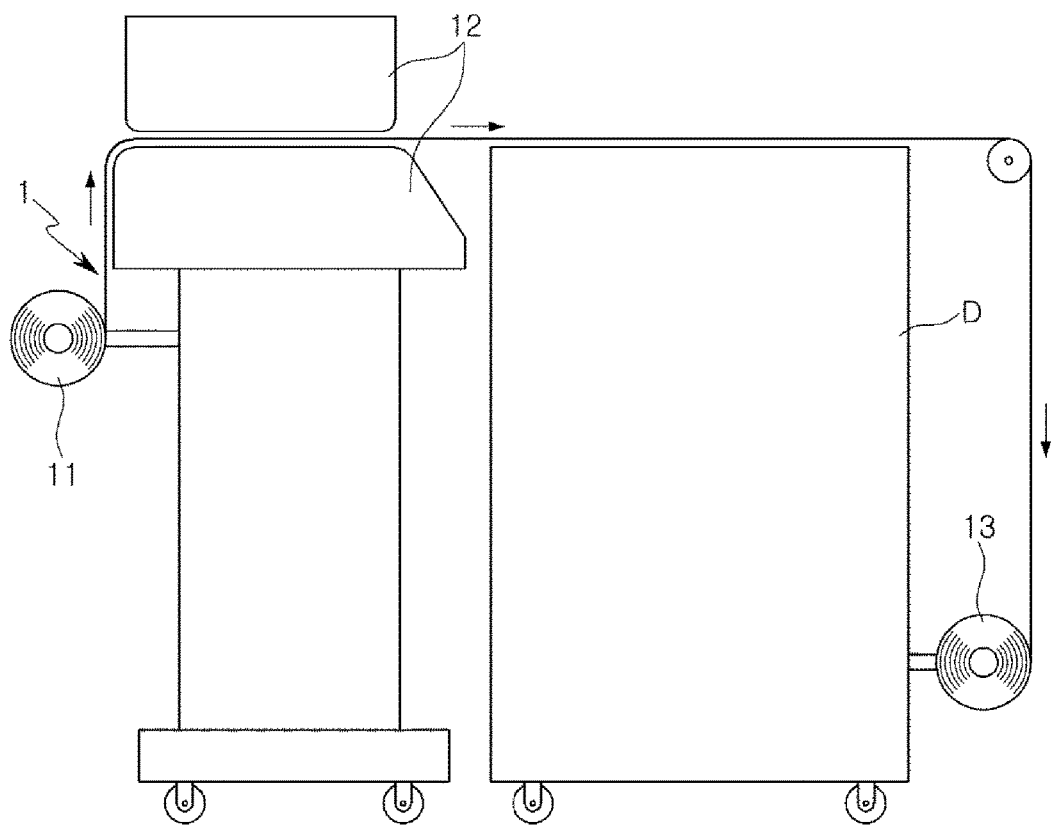

[FIG. 3]
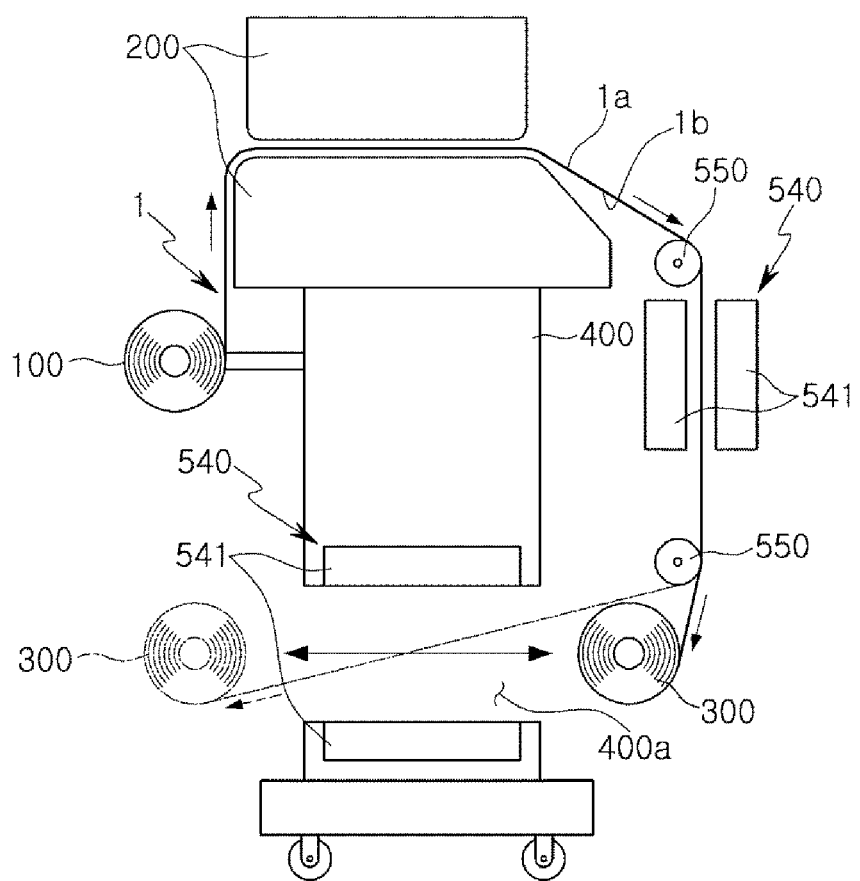

[FIG. 4]
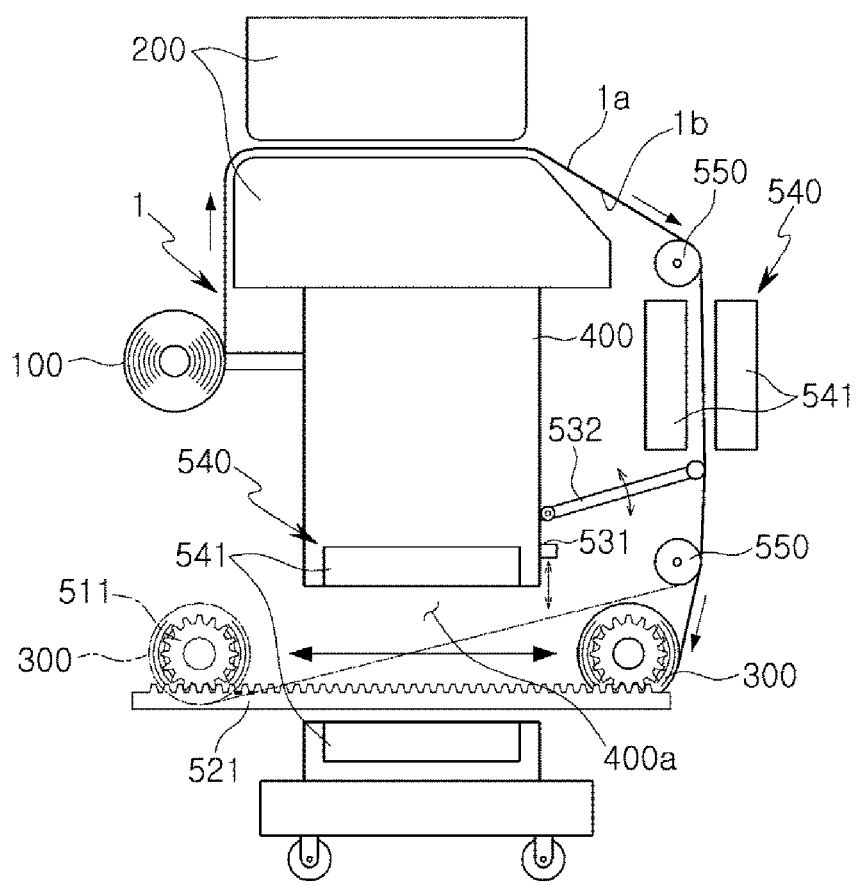

[FIG. 5]
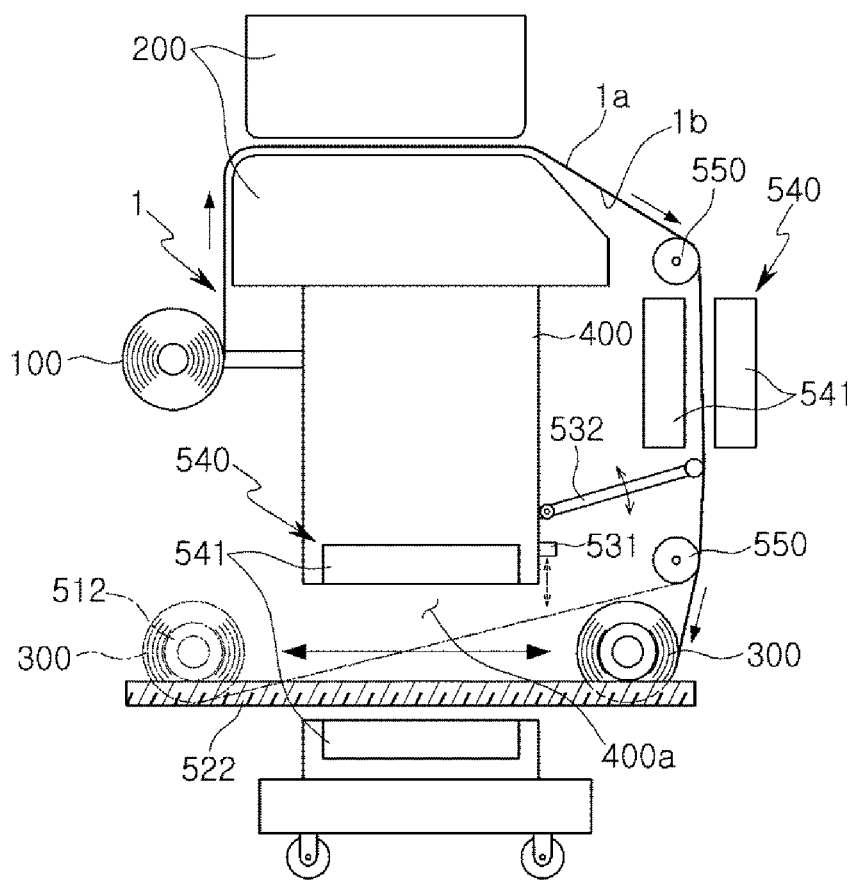

[FIG. 6]
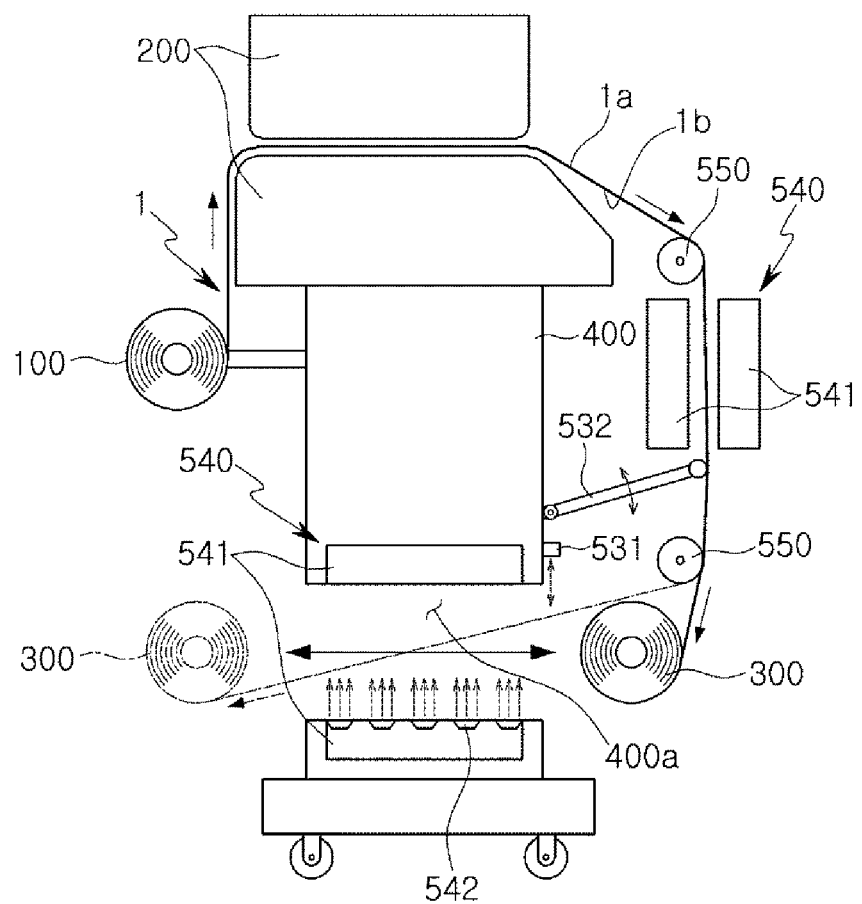

PRINTING DEVICE

TECHNICAL FIELD

The present disclosure relates to a printing device, and particularly, to a printing device for printing text or an image on a material.

BACKGROUND ART

In the printing market, conventional hand work has rapidly changed to digital printing techniques, and print output speed has rapidly increasing due to improvements in the manufacturing technology of printing devices.

However, as compared to print output speed, which is faster than before, a drying speed of print output may not follow print output speed. Therefore, in the case that dyeing, contamination, and the like, occurs, the output may be damaged or lost.

To improve this, various types of dryers have been developed, but drying speeds may be slow, so that drying efficiency may also be low. Moreover, as a dryer takes up a lot of installation space, space utilization may be poor. As described above, many complex problems remain.

In detail, in a printing device according to the related art, as an exemplary embodiment, in order to increase a drying time, while a material wound from an unwinding unit is slowly printed in a printing unit, the material is wound onto a winding unit. However, since a printing speed is significantly reduced, there may be a problem of inefficiency in terms of production.

Moreover, in another exemplary embodiment, in a printing device, as illustrated in FIG. 1, after a material 1, unwound from a unwinding unit 11, is printed in a printing unit 12, before the material is wound on a winding unit 13, while the material 1, a printed material, is moved to be adjacent to a dryer D, in order to increase a drying time, a direction changing roller R is used to change a direction of a drying route, thereby extending the drying route. However, due to the direction changing roller R, a printed side 1a (an upper surface in the drawings) of the material 1 may come into contact with the direction changing roller R, whereby a problem in which the printed side 1a is contaminated may occur.

In addition, as a different exemplary embodiment, in a printing device, as illustrated in FIG. 2, after a material 1 wound from a unwinding unit 11 is printed in a printing unit 12, before the material is wound on a winding unit 13, in order to increase a drying time of the material 1, a printed material, a moving route of the material 1 is lengthened. In addition, in order to continuously dry the material along such a long moving route, a dryer D having a large volume is used. However, since such a large dryer D may takes up a considerable amount of installation space, only a relatively small number of printing devices may be located in a predetermined space. Therefore, it may be inefficient in terms of productivity, and a problem in which it may not be able to be installed in a small installation space at all may further occur.

DISCLOSURE

Technical Problem

An aspect of the present disclosure may provide a printing device having a structure allowing a winding unit to reciprocate, convenient while a workload is reduced at the beginning of printing.

Technical Solution

According to an aspect of the present disclosure, a printing device includes: a main body including a printing unit for printing on a material and a winding unit for winding a printed material; and a moving device provided in the main body and configured to allow the winding unit to reciprocate between an outlet space of the printing unit and an inlet space thereof.

The main body may further include: a support unit in which the printing unit is installed thereabove and in which the winding unit is installed therebelow, and reciprocating of the winding unit may be carried out along a through path of the support unit.

The moving device may include: a rotating member mounted on the winding unit to be rotatably driven; and a support member provided in the support unit and extended from the inlet space of the printing unit to the outlet space thereof along the through path of the support unit, and with which the rotating member is in contact to be supported so as to allow the rotating member to be rotated and moved.

The rotating member may be interlocked with a rotary driving shaft formed in a winding driving member of the winding unit.

The winding driving member may be a torque motor or a servomotor.

In an exemplary embodiment, the rotating member may be a pinion gear, and the support member may be a rack gear or a timing belt.

In another exemplary embodiment, the rotating member may be a helical gear, and the support member may be a screw shaft.

The moving device may further include: a guide device disposed in parallel with the support member, supporting and guiding the winding unit moving in a longitudinal direction of the support member.

The moving device may include: a support member extended from the inlet space of the printing unit to the outlet space thereof along the through path of the support unit, and installed in the support unit to be rotated as a lever structure, and the winding unit may be seated on the support member to reciprocate, by self weight, along the support member at an incline.

The moving device may further include: a blocking member disposed to block upward rotation of an end of the support member on a side of the inlet space of the printing unit or on a side of the outlet space thereof.

The moving device may further include: an elastic member disposed to apply elastic force to an end of the support member on a side of the inlet space of the printing unit or on a side of the outlet space thereof, so as to allow the support member to return to an original state thereof when the support member rotates.

To maintain tension of the material to be wound on the winding unit, the support unit may be provided with a tension sensing member electrically connected to the winding driving member may be mounted thereon.

The tension sensing member may be at least one of a proximity sensor, a photosensor, a laser sensor, and a tension bar.

At least one of the outlet space of the printing unit, or a proximity portion of the through path of the support unit, along which the winding unit passes, may be provided with a drying member disposed therein.

The drying member may be at least one of a radiation dryer and a blower.

The blower may be disposed in a lower portion of the through path of the support unit, and air may be injected upwardly from below the material.

When the drying member is disposed in the outlet space of the printing unit, a plurality of direction changing rollers, on which the material is wound to allow a direction of the material to be changed, may be alternately disposed in an upper portion and a lower portion of the through path of the support unit.

The outlet space of the printing unit and the through path of the support unit, along which the winding unit passes, may be provided with at least one support roller for supporting a non-printed side of the printed material disposed therein.

Advantageous Effects

According to an exemplary embodiment in the present disclosure, a printing device may be configured to include a moving device, allowing a winding unit to reciprocate between an outlet space of a printing unit and an inlet space thereof, and thus, in a work process in which a front end of a material is wound on the winding unit to be fixed thereto at the beginning of printing, moving the front end of the material from the outlet space of a printing unit to an inlet space thereof may be automatically carried out by the winding unit reciprocated by the moving device. Therefore, a workload of an operator may be reduced and a printing time may be also reduced, thereby ultimately increasing productivity and also preventing damage to a material and safety accidents.

DESCRIPTION OF DRAWINGS

FIGS. 1 and 2 are views of a printing device according to the related art.

FIG. 3 is a schematic view of a printing device according to an exemplary embodiment in the present disclosure.

FIG. 4 is a view of a moving device according to an exemplary embodiment in the printing device of FIG. 3 in detail.

FIG. 5 is a view of a moving device according to a different exemplary embodiment in the printing device of FIG. 3 in detail.

FIG. 6 is a view of a drying device according to a different exemplary embodiment in the printing device of FIG. 3.

BEST MODE FOR INVENTION

In adding the reference numerals to the components of each drawing, although the same components are illustrated in different drawings, it is noted that they should have as many of the same numerals as possible. Further, in describing the present disclosure, when it is determined that the gist of the present disclosure may be rendered unclear due to a specific description of the related known configuration or function, a detailed description thereof will be omitted.

FIG. 3 is a schematic view of a printing device according to an exemplary embodiment in the present disclosure, and FIGS. 4 and 5 are views of a moving device according to various exemplary embodiments in the printing device of FIG. 3.

In addition, FIG. 6 is a view of a drying device according to a different exemplary embodiment in the printing device of FIG. 3.

Referring to the drawings, a printing device may include a main body for printing on a material 1 and winding the material, and a moving device for moving a winding unit 300 of the main body.

Here, the main body may include a printing unit 200 for printing the material 1, and the winding unit 300 for winding the material 1 printed by the printing unit 200.

First, the printing unit 200 is configured to print set text or a set image on the material 1. The printing unit 200 is not limited in the present disclosure as long as a desired shape is able to be printed on the material 1 with ink, and any printing unit according to the related art may be used. In this case, the material 1, a material on which set text or a set image is able to be printed with ink, is mainly provided as paper or cloth, but other materials in the form of a sheet may be used in addition thereto.

In addition, the winding unit 300, a unit for winding and arranging the material 1 printed by the printing unit 200, that is, output, may be referred to as take up, and may include a winding driving member and a winding roll for winding the material 1 while being rotatably driven by the winding driving member. In this case, the winding roll may be mainly provided as a paper tube formed of a paper material, and the winding driving member may be provided as a motor, by way of example.

Furthermore, a printing device in the present disclosure may be configured to manually supply the material 1 to the printing unit 200 by an operator. In a manner different therefrom, as illustrated in the drawings, a unwinding unit 100 for supplying the material while unwinding the material 1 wound so as to automatically and continuously supply the material 1 to the printing unit 200.

Meanwhile, a printing device in the present disclosure may have a structure for increasing drying time with respect to the material 1, a printed material, to increase drying efficiency so as to correspond to a faster printing speed, in order to increase productivity when printing the material 1.

As described above, to increase the drying time, a drying route is required to be lengthened. To this end, in a printing device of the present disclosure, a drying route, leading from an outlet space of the printing unit 200 to an inlet space thereof along a circumference of the printing unit 200, may be formed. To this end, the winding unit 300 is disposed in the outlet space of the printing unit 200.

In detail, the main body further includes a support unit 400 in which the printing unit 200 is installed thereabove and in which the winding unit 300 is installed therebelow, and thus, reciprocating of the winding unit 300 may be carried out along a through path 400*a* of the support unit 400. In this case, the support unit 400 is illustrated as being divided into an upper portion of the support unit 400 and a lower portion thereof by the through path 400*a* in the drawings, but the support unit has a structure in which the upper portion and the lower portion are connected through both sides of the through path 400*a*.

However, in a case in which the winding unit 300 does not have a structure in which the winding unit reciprocates, but a structure in which a position of the winding unit is fixed at an inlet space of the printing unit 200, so as to wind the material 1, coming out from an outlet space in the printing unit 200, on the winding unit 300 first, after an operator directly and manually inserts a front end of the material 1 into the printing unit 200 in an inlet space of the printing unit 200, and then, the operator moves to the outlet space of the printing unit 200 and changes a direction of the front end of the material 1 from the outlet space of the printing unit 200 to push the material into the inlet space of the printing unit 200, the operator moves to the inlet space of the printing unit 200 again to wind the front end of the material 1 onto the winding unit 300, disposed on the inlet space of the printing unit 200, to be fixed thereto.

In this case, there may be inconvenience, in that an operator moves from an inlet space of the printing unit 200 to an outlet space thereof, and then to the inlet space thereof again. Thus, the printing time may be increased. To prepare for this, even in a case in which a lot of labor is required to decrease the printing time, a problem of inefficiency in terms of productivity may occur. In addition, when an operator pushes and moves a material while a direction of a front end of the material 1 is directly changed from an outlet space of the printing unit 200 to an inlet space thereof, a situation in which the material 1 is damaged or a risk of a safety accident is significant may occur.

To solve the problems described above, the moving device may be configured to allow the winding unit 300 to reciprocate between the outlet space of the printing unit 200 and the inlet space thereof.

Thus, after a front end of the material 1 is inserted into the printing unit 200 in the inlet space of the printing unit 200, when an operator moves to the outlet space of the printing unit 200 and winds the front end of the material 1 on the winding unit 300 to be fixed thereto, the winding unit 300 is automatically moved to the inlet space of the printing unit 200 by the moving device. Thus, a workload of the operator is reduced and printing time is reduced, thereby ultimately increasing productivity. In addition, a work process, in which the operator directly pushes and moves a material while a direction of the front end of the material 1 is changed toward the inlet space of the printing unit 200, is eliminated, thereby preventing damage to the material 1 and safety accidents.

In detail, the moving device described above may include a rotating member mounted on the winding unit 300 to be rotatably driven, and a support member extended from an inlet space of the printing unit 200 to an outlet space thereof.

In this case, the support member is provided in the support unit 400 and extended from the inlet space of the printing unit 200 to the outlet space thereof along the through path 400a of the support unit 400, and may have a structure in which a rotating member is in contact therewith to be supported thereby so as to allow the rotating member to be rotated and moved.

In addition, the rotating member may be interlocked with a rotary driving shaft formed in a winding driving member of the winding unit 300. Thus, in order to allow the rotating member to be rotatably driven, a moving device according to an exemplary embodiment does not include a separate driving member but uses driving force generated in a winding driving member of the winding unit 300, whereby the number of components may be reduced and a smaller amount of driving force may be used. Thus, there is an advantage of efficiency in terms of device manufacturing.

In this case, in terms of a specific connection structure of the rotating member with respect to the winding driving member, a proper interlocking structure may be provided in consideration of rotation of the winding unit 300.

Furthermore, the moving device is not limited to an exemplary embodiment, and the moving device further includes a separate driving member separately from the winding driving member, thereby allowing the rotating member to be rotatably driven.

In addition, in the moving device, the winding driving member may be provided as a torque motor or a servo motor, to be rotated forwards and in reverse.

Meanwhile, in the moving device, the rotating member and the support member may be provided as various exemplary embodiments. As illustrated in FIG. 4, a pinion gear 511 may be used as the rotating member, and a rack gear 521 or a timing belt may be used as the support member.

In addition, in the moving device, as illustrated in FIG. 5, a helical gear 512 may be used as the rotating member, and a screw shaft 522 may be used as the support member.

In addition, the moving device may further include a guide device for supporting and guiding the winding unit 300, although not illustrated in the drawings.

The guide device may be disposed in parallel with the support member to serve to guide the winding unit 300 while supporting the winding unit moving in a longitudinal direction of the support member, and an LM guide may be used therefor by way of preferred example.

Meanwhile, the support member of the moving device, in another exemplary embodiment, may have a structure in which the support member is extended from an inlet space of the printing unit 200 to an outlet space thereof along a through path of the support unit 400 and is installed in the support unit 400 to be rotated as a lever structure, although not illustrated in the drawings.

In this case, the winding unit 300 may have a structure in which the winding unit is seated on a support member to reciprocate, by self weight, along the support member at an incline.

Here, the moving device may further include a blocking member (not shown) disposed to block upward rotation of an end of the support member on a side of an inlet space of the printing unit 200 or on a side of an outlet space thereof. After an operator presses an end of the support member to allow the support member to have a structure at an incline, so as to continuously maintain pressing pressure with respect to the end of the support member while the winding unit 300 is lowered by self weight along the support member at an incline, the blocking member may be mounted on the support unit 400 to block upward rotation of the end of the support member. The blocking member may be provided as any member having a structure for catching the end of the support member such that the end of the support member does not move upwardly. In addition, the blocking member may be configured to block upward rotation of the end of the support member and also to unblock the upward rotation thereof.

In addition, the moving device may further include an elastic member (not shown) disposed to apply elastic force to the end of the support member on a side of an inlet space of the printing unit 200 or on a side of an outlet space thereof, so as to allow the support member to return to an original state thereof when the support member rotates. The elastic member may only be disposed in one side, of a side of an inlet space of the printing unit 200 and a side of an outlet space thereof, and mounted on the support unit 400 to be connected to a lower portion of the end of the support member so as to be pulled downwards, by way of preferred example. Thus, when no external force is exerted, the support member may maintain a structure at a downward incline toward a side in which the elastic member is disposed. In this case, the blocking member described above may be disposed in the other side in which an elastic member is not disposed, of a side of an inlet space of the printing unit 200 and a side of an outlet space thereof.

Furthermore, in an exemplary embodiment, in order to maintain tension of the material 1 to be wound on the winding unit 300, a tension sensing member electrically connected to a winding driving member may be mounted on the support unit 400.

The tension sensing member may be provided as at least one of a sensor 531 among a proximity sensor, a photosensor, and a laser sensor, or a tension bar 532. By way of example, as illustrated in FIGS. 4 to 6, the tension bar 532 may be disposed to detect tension of the material 1 in an outlet space of the printing unit 200, and the proximity sensor, the photosensor, or the laser sensor, which is the sensor 531, may be disposed to detect tension of the material 1 in the through path 400a of the support unit 400. For reference, the tension bar 532, as a member for mechanically detecting tension in a manner different from an electronic monitoring system of the sensor 531, may be provided as other tension sensing mechanical members.

Meanwhile, a printing device in the present disclosure may include a drying member 540 for drying the material 1, a printed material. The drying member 540 may be disposed in an outlet space of the printing unit 200, or may be disposed in a proximity portion of the through path 400a of the support unit 400, along which the winding unit 300 passes, in the support unit 400.

Here, since the drying member 540 is preferably disposed in the proximity portion of the through path 400a along which the winding unit 300 passes in the support unit 400, in addition to the outlet space of the printing unit 200, a drying efficiency of the material 1, a printed material, may be increased, but an exemplary embodiment is not limited thereto. Alternatively, the drying member may only be disposed in one of two positions, although not illustrated in the drawings.

The drying member 540, as an exemplary embodiment, may be provided as a radiation dryer 541 for drying the material 1, a printed material, by radiating heat. The radiation dryer 541 may be provided as a heat radiation member such as a heating coil and a light emitting member (an infrared lamp, or the like).

In addition, as illustrated in FIG. 6, the drying member 540, as another exemplary embodiment, may be provided as a blower 542 for drying the material 1, a printed material, by the medium of air. The blower 542 may preferably include a heater embedded therein to allow hot air to come out therefrom, as an example. Alternatively, the blower may be disposed with the radiation dryer 541 as illustrated in the drawings, as another example, whereby air is heated by the radiation dryer 541 to make hot air, without the need for a separate heater embedded therein.

When the blower 542 described above is disposed in a lower portion of the through path 400a in the support unit 400, the blower is configured to allow air to be injected upwardly from below the material 1. Thus, the blower may serve to dry the material 1, a printed material, passing along the through path 400a of the support unit 400 and to maintain tension by preventing the material from drooping downwardly.

Furthermore, in a printing device in the present disclosure, when the drying member 540 is disposed in an outlet space of the printing unit 200, although not illustrated in the drawings, a plurality of direction changing rollers, on which the material 1 is wound to allow a direction of the material to be changed, may be alternately arranged in an upper portion and a lower portion of the through path 400a of the support unit 400.

In other words, in various cases according to the material 1 or an amount of printed ink, when ink is almost dried by the drying member 540 disposed in the outlet space of the printing unit 200 and there is no worry of contamination caused by a direction changing roller, as a plurality of direction changing rollers are disposed in the through path 400a of the support unit 400, a drying route may be lengthened.

In this case, the direction changing roller may have a structure in which the direction changing roller is located so as not to interfere with a movement path of the winding unit 300. As an example, the direction changing roller may have a movable structure in which the direction changing roller is moved and disposed in an appropriate position after the winding unit 300 passes through.

Meanwhile, in the outlet space of the printing unit 200 and in the through path 400a of the support unit 400 along which the winding unit 300 passes, at least one support roller 550 for supporting a non-printed side 1b of the material 1, a printed material, may be disposed therein.

In other words, when the material 1, a printed material, moves in the outlet space of the printing unit 200, and when the material moves in the through path 400a of the support unit 400 along which the winding unit 300 passes, the non-printed side 1b of the material 1, a printed material, is supported by the support roller 550 to maintain tension of the material 1, a printed material. Thus, as the material, a printed material, is not in contact with other proximity components, contamination of the material 1, a printed material, may be prevented, thereby increasing printing quality.

For reference, the printed side 1a of the material 1 refers to an upper surface of the material 1 immediately after coming out of the printing unit 200 in the drawings, and the non-printed side 1b thereof refers to a lower surface of the material 1 in this case. In addition, the support roller 550 is illustrated only in the outlet space of the printing unit 200 in the drawings, by way of example. Although not illustrated in the drawings, when the support roller is disposed in the through path 400a of the support unit 400, so as not to interfere with the winding unit 300 passing along the through path 400a, the support roller has a configuration in which the support roller is lowered for a predetermined period of time by detecting a process in which the winding unit 300 passes during the process, and the support roller is lifted again after the winding unit 300 passes.

As a result, in a printing device in the present disclosure, since the moving device is configured to allow the winding unit 300 to reciprocate between the outlet space of the printing unit 200 and the inlet space thereof, in a work process for winding a front end of the material 1 on the winding unit 300 to be fixed thereto at the beginning of printing, moving the front end of the material 1 from an outlet space of the printing unit 200 to an inlet space thereof is automatically carried out by the winding unit 300 reciprocated by the moving device. Thus, a workload of an operator is reduced and printing time is reduced to ultimately increase productivity, thereby preventing damage to the material 1 and safety accidents.

While exemplary embodiments with respect to a cutting device and a cutting method have been shown and described above, it will be apparent to those skilled in the art that modifications and variations could be made without departing from the scope of the present invention as defined by the appended claims.

The invention claimed is:
1. A printing device, comprising:
 a main body including a printing unit for printing on a material and a winding unit for winding a printed material; and a moving device provided in the main body and configured to allow the winding unit to reciprocate between an outlet space of the printing unit and an inlet space thereof, wherein the main body further includes a support unit on which the printing unit is installed thereabove and on which the winding unit is installed therebelow, and wherein reciprocating of the winding unit is carried out along a through path of the support unit, and wherein the moving device includes:

a support member extended from the inlet space of the printing unit to the outlet space thereof along the through path of the support unit, and installed in the support unit to be rotated as a lever structure, and the winding unit is seated on the su port member to reciprocate, by self weight, along the support member at an incline.

2. The printing device of claim 1, wherein the moving device further includes:

a blocking member disposed to block upward rotation of an end of the support member on a side of the inlet space of the printing unit or on a side of the outlet space thereof.

3. The printing device of claim 1, wherein the moving device further includes:

an elastic member disposed to apply elastic force to an end of the support member on a side of the inlet space of the printing unit or on a side of the outlet space thereof, so as to allow the support member to return to an original state thereof when the support member rotates.

4. The printing device of claim 1, wherein, to maintain tension of the material to be wound on the winding unit, the support unit is provided with a tension sensing member electrically connected to the winding driving member mounted thereon.

5. The printing device of claim 4, wherein the tension sensing member is at least one sensor among a proximity sensor, a photosensor, and a laser sensor, or a tension bar.

6. The printing device of claim 1, wherein at least one of the outlet space of the printing unit and a proximity portion of the through path of the support unit, along which the winding unit passes, is provided with a drying member disposed therein.

7. The printing device of claim 6, wherein the drying member is at least one of a radiation dryer and a blower.

8. The printing device of claim 7, wherein the blower is disposed in a lower portion of the through path of the support unit, and air is injected upwardly from below the material.

9. The printing device of claim 6, wherein, when the drying member is disposed in the outlet space of the printing unit, a plurality of direction changing rollers, on which the material is wound to allow a direction of the material to be changed, are alternately disposed in an upper portion and a lower portion of the through path of the support unit.

10. The printing device of claim 1, wherein, the outlet space of the printing unit and the through path of the support unit, along which the winding unit passes, are provided with at least one support roller for supporting a non-printed side of the printed material disposed therein.

* * * * *